United States Patent [19]
Kersten et al.

[11] 4,447,165
[45] May 8, 1984

[54] BUCKET WHEEL BEARING WITH SPLIT ROLLING BEARING

[75] Inventors: Peter Kersten; Peter Meixner; Erich Müller; Eckart Höring, all of Magdeburg, German Democratic Rep.

[73] Assignee: VEB Schwermaschinenbaukombinat TAKRAF, Leipzig, German Democratic Rep.

[21] Appl. No.: 372,593

[22] Filed: Apr. 28, 1982

[30] Foreign Application Priority Data

Dec. 2, 1981 [DD] German Democratic Rep. ..................... 2353275

[51] Int. Cl.³ ............................................. F16C 35/00
[52] U.S. Cl. ................................................... 384/428
[58] Field of Search ............... 308/189 R, 207 R, 178, 308/193, 195, 196, DIG. 11; 384/428, 429, 430, 432, 434, 435, 438, 210; 37/189

[56] References Cited

U.S. PATENT DOCUMENTS

| | | | |
|---|---|---|---|
| 2,897,022 | 7/1959 | Marola | 308/DIG. 11 X |
| 3,214,224 | 10/1965 | Lash | 308/189 R X |
| 3,876,265 | 4/1975 | McCloskey | 308/189 R X |
| 3,989,323 | 11/1976 | Lambert | 308/207 R X |
| 4,199,202 | 4/1980 | Maeda | 384/434 X |

*Primary Examiner*—Stuart S. Levy
*Assistant Examiner*—David Werner
*Attorney, Agent, or Firm*—Jordan and Hamburg

[57] ABSTRACT

A bucket wheel bearing assembly adapted to be attached to a bucket wheel support structure for rotationally supporting bucket wheel shaft to the support structure comprises bucket wheel bearing means to be disposed on the bucket wheel shaft, a bearing box situated outside the bucket wheel bearing means and having a central projection with slanted side faces at the entire outer surface thereof and two side walls, the slanted side faces extending radially outwardly toward the central projection from the both side walls, locking means to be disposed alongside of the central projection of the bearing box, and a plurality of fastening means for connecting the locking means around the bearing box, some of the fastening means connecting the locking means and the bearing box to the support structure. The bearing box includes at least a first bearing half and a second bearing half so that the first and second bearing halves, when assembled together, cover the bucket wheel bearing means entirely at the inside surface thereof. The locking means includes inner slanted faces to abut against the slanted side faces of the bearing box so that when the locking means is connected to the bearing box, the first and second bearing halves are tightly connected together with forces radially inwardly applied to the slanted side faces of the bearing box from the locking means.

6 Claims, 3 Drawing Figures

BUCKET WHEEL BEARING WITH SPLIT ROLLING BEARING

BACKGROUND OF THE INVENTION

The invention relates to a bucket wheel bearing or a bearing for large rotatory bodies, particularly as used for mining large strip aggregates. The invention provides a momentum-free support between two flanges of a shaft of an overhung planetary gear drive and located at the apex of a wheel arm with changing inclination by joining one half of the bearing box solidly to the members of a support-triangle structure whereby the axes of such members pass through each other at the axis of the bearing. The split joint of the bearing is disposed at a sufficiently large angle relative to the axis of the wheel arm axis, and the halves of the bearing box are supported axially at the circumference by means of unseparated locking rings having conical inner seating surfaces that mate with respective outer seating surfaces on the bearing box.

This invention is used for supporting large rotating bodies with bucket wheels at the apex of a comparatively long arm which has a changing inclination, particularly as used for large scale strip mining of aggregates.

It is known to arrange bucket wheel bearings for drives with spur gear systems by means of unseparated or non-split rolling bearings on a wheel arm in such a manner that the resulting supporting force is separated by a support triangle into tensile and pressure forces such that predictable and momentum-free static conditions are thereby obtained.

Such constructions as made by the leading manufactures of bucket wheel excavators result in large dimensions and difficulties in construction due to the large forces being handled.

It is furthermore well known how to make large rolling bearings as split bearings where the bearing cap is radially screwed down and where all separation surfaces have to be prepared with a very exact fit and juncture. The advantage of relatively easy mounting obtained thereby is reduced according to each use in relation to the reduced life expectancy so that such bearings may be used only in special cases. Such a case may be found when utilizing a planetary gear drive which is advantageous as compared to a mass-intensive or heavy spur gear system, because these must be an overhung on the support bearing at the side of the gear. The known split rolling bearings have the disadvantage that the direction of the resultant supporting force is not allowed to cross the screwed-on half of the bearing, because otherwise the radial threaded support would become overloaded and the screwed-on bearing parts would be deformed. This means that in the arrangement of a wheel arm of a bucket excavator, the separation joint must be disposed at an angle as small as possible relative to the longitudinal axis of the wheel arm in order to fulfill the aforementioned condition even at maximum deep positions of the wheel arm.

This makes it impossible to form a support triangle while preserving the needed freedom underneath the wheel arm that is imperative particularly when cutting above track level and makes it necessary to construct an exceedingly expensive support construction for the supporting forces.

The invention is directed to especially arranging the gear side support bearing of a planetary gear drive at the crossing point of a support triangle of a wheel arm in order to prevent expensive construction, burdened by flexural moments and in order to provide simple conditions of mounting.

Thus the invention has as an object to provide a bucket wheel mounting with a split rolling bearing for an overhung planetary gear drive, wherein a supporting triangle is provided between the bucket wheel bearing and the bucket wheel arm, wherein between two flanges of the shaft or the hollow shaft at the drive side of the bucket wheel shaft the divided rolling bearing is arranged in a divided bearing box for acceptance of the variable resultant support force and wherein the angle between the dividing plane of the bearing box and the longitudinal axis of the wheel arm permits the axial and solid connection of the members of the supporting triangle to the part of the bearing box.

The object is achieved according to the invention by providing the divided bearing box with conical outer seats at both sides, and these are supported by undivided locking rings by means of mounting screw members or bolts uniformly distributed at the circumference of the locking rings, wherein the smallest inner diameter of the locking rings is larger than the outer diameter of at least one of the two shaft flanges.

In a further embodiment both halves of the bearing box are held together by screws and are fixed on each other by fitting steps and fitting pins. The axial support by the two locking rings according to the invention provides that the divided bearing is uniformly capable of bearing and translating in every position of the wheel arm the resultant support force as pressure and tension forces are applied to the supporting triangle. According to the invention, the position of the joint may be chosen in such a manner that optimum advantageous conditions of mounting will be obtained as well as optimum forces relating to the supporting triangle.

The disadvantage of short life expectancy of the divided rolling bearing is not only removed by the substantially lower bulk, on the one hand, and by the thereby related possibility of obtaining higher circulary and cutting forces, in other words, a considerably improved technique of the device, but is also justified as needed by greatly overpowering advantages.

DESCRIPTION OF THE PREFERRED EMBODIMENTS

Figure 1:
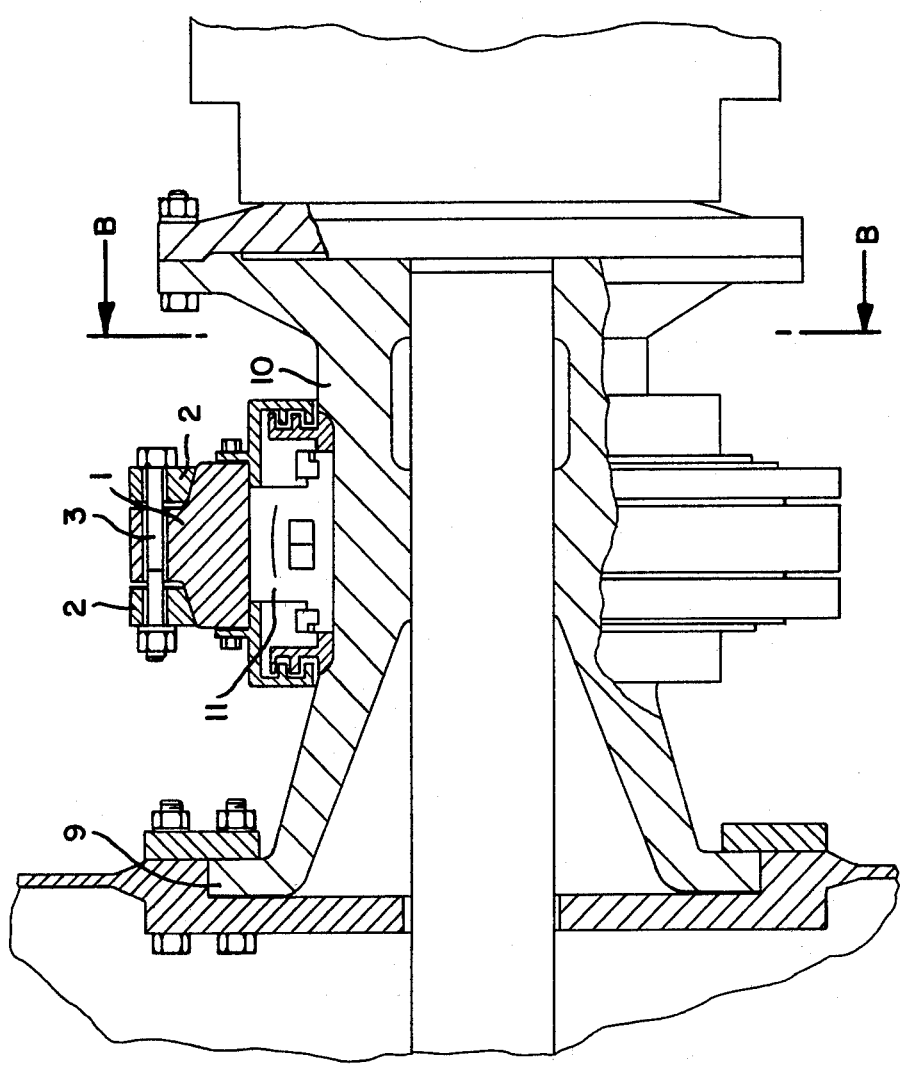
FIG. 1 is a sectional view through the divided bucket wheel bearing taken along the line A—A in FIG. 2.
Figure 2:
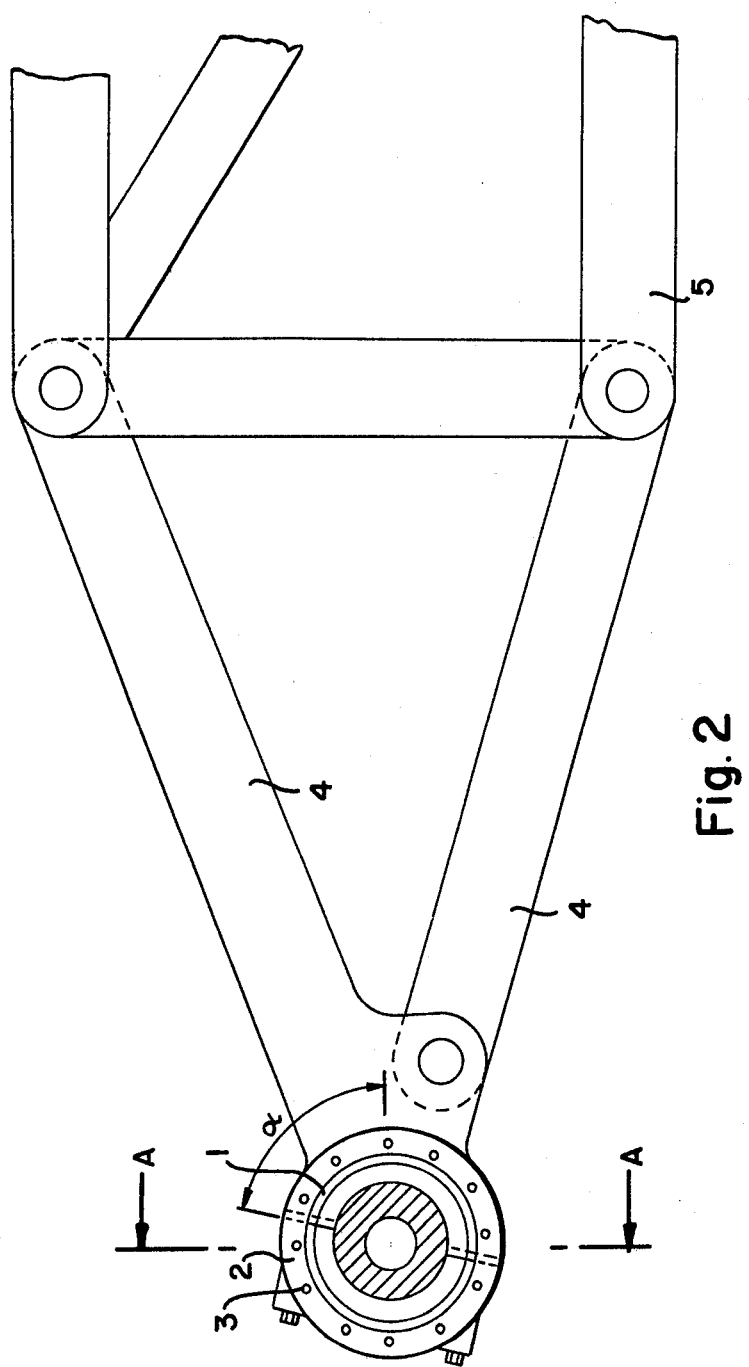
FIG. 2 is a sectional view of the bearing box and supporting triangle for the wheel arm taken along the line B—B in FIG. 1.
Figure 3:
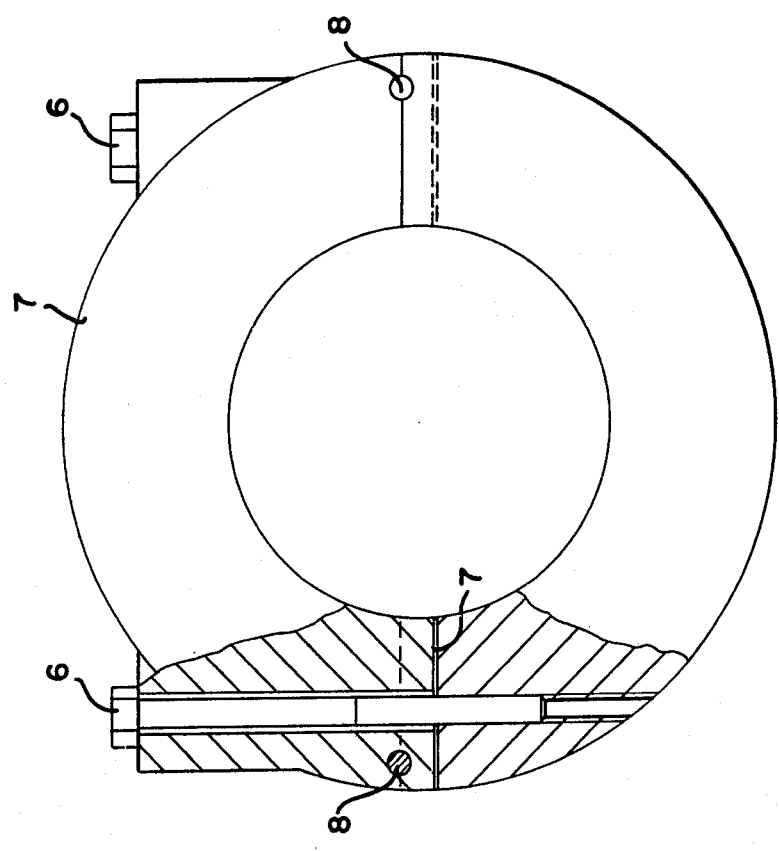
FIG. 3 is a view partly broken away and in section of the bearing box with radial threaded elements.

A divided rolling bearing 11 is mounted lockingly upon a shaft or hollow shaft 10. A bearing box 1 which is also divided has outer seating surfaces at both sides upon the outer circumference thereof. Conical inner seat surfaces on locking rings 2 mate with these outer seating surfaces. By means of bolts 3, the locking rings 2 and both halves of the bearing box 1 are solidly and axially supported at the conical surfaces. One half of the bearing box 1 is solidly connected to a supporting triangle 4, in which case the members of supporting triangle 4 are preferably detachable connected to each other and the half of the bearing box is fastened solidly or integrally to one of the members.

The supporting triangle 4 is connected to a wheel arm 5. To provide an exact fitting of the conical outer seating surfaces and the inner diameter of the bearing box 1 as well as for the exact mounting thereof, fitting steps 7 and fitting pins 8 are provided as well as a radial threaded support by means of threaded elements 6.

What we claim is:

1. A bucket wheel bearing assembly adapted to be attached to a bucket wheel support structure for rotationally supporting a bucket wheel shaft on the support structure, comprising bucket wheel bearing means to be disposed on said bucket wheel shaft;

a bearing box situated outside said bucket wheel bearing means, said bearing box including at least a first bearing half and a second bearing half so that the first and second bearing halves, when assembled together, cover the bucket wheel bearing means entirely at the inside surface thereof, said bearing box having a central projection with slanted side faces at the entire outer surface thereof and two side walls, said slanted side faces extending radially outwardly toward said central projection from both said side walls, locking means to be disposed alongside of said central projection of said bearing box, said locking means having inner slanted faces to mate with said slanted side faces of the bearing box so that when the locking means is connected to the bearing box, the first and second bearing halves are tightly and evenly connected together with forces radially inwardly applied to the slanted side faces of the bearing box from the locking means, and a plurality of fastening means for connecting the locking means around the bearing box, some of the fastening means connecting the locking means and bearing box to the support structure.

2. A bucket wheel bearing assembly according to claim 1, in which said locking means comprises a pair of locking rings to be disposed on side portions of said central projection, each locking ring having the inner slanted face abutting against a respective slanted side face of the bearing box.

3. A bucket wheel bearing assembly according to claim 2, in which each fastening means comprises a bolt and a nut, said bolt passing through said locking rings and the central projection between said locking rings and being fastened by said nut so that the locking means and the bearing box are connected together.

4. A bucket wheel bearing assembly according to claim 3, further comprising threaded elements for connecting said first and second bearing halves together, said threaded elements being inserted into one of the first and second bearing halves in the direction perpendicular to the bucket wheel shaft and firmly engaged with the other of the bearing halves.

5. A bucket wheel bearing assembly according to claim 4, further comprising fitting pins disposed between the abutting surfaces of the first and second bearing halves, said first and second bearing halves further including fitting steps at the abutting surfaces thereof so that the relative position of the first and second bearing halves can be substantially held in correct position.

6. A bucket wheel bearing assembly according to claim 5, in which said bucket wheel bearing means comprises first and second bearings connected to the outer periphery of the bucket wheel shaft.

* * * * *